United States Patent [19]

Shackleford

[11] 4,243,257
[45] Jan. 6, 1981

[54] GRIPPER MECHANISM

[75] Inventor: Geoffrey G. Shackleford, Basingstoke, England

[73] Assignee: Lansing Bagnall Limited, Hampshire, England

[21] Appl. No.: 27,602

[22] Filed: Apr. 5, 1979

[30] Foreign Application Priority Data

Apr. 4, 1978 [GB] United Kingdom ............... 13190/78

[51] Int. Cl.³ ............................................. B25B 1/00
[52] U.S. Cl. ................................................. 294/88
[58] Field of Search ..................... 294/88, 103 R, 118, 294/90, 104, 86, 33, 162 A; 414/22, 745

[56] References Cited

U.S. PATENT DOCUMENTS 3,449,008 6/1969 Colechia ................................. 294/88
3,937,515 2/1976 Longowski ............................ 294/88

FOREIGN PATENT DOCUMENTS 236722 7/1925 United Kingdom ...................... 294/88
1036664 7/1966 United Kingdom ...................... 294/88
1422196 1/1976 United Kingdom ...................... 294/88

Primary Examiner—James B. Marbert
Attorney, Agent, or Firm—Cushman, Darby & Cushman

[57] ABSTRACT

A gripper which has a fixed jaw formed as an extension of an elongate support and a movable jaw constrained to move without rotation towards and away from the fixed jaw. A pneumatic cylinder is disposed along the support, being pivoted at one end thereto, and has a stroke directed along the support. The piston is connected by way of a bell crank to the linkage to effect movement of the movable jaw.

5 Claims, 2 Drawing Figures

GRIPPER MECHANISM

FIELD OF THE INVENTION

This invention relates to a gripping mechanism which is particularly but not exclusively intended for use in robot controlled or other automatic machinery.

SUMMARY OF THE INVENTION

There are, as is well known, many forms of gripper or gripping mechanism adapted for many purposes. The object of the present invention is, however, to provide a comparatively simple, compact gripper, which in a preferred embodiment is adaptable for remote operation.

The gripper according to the invention preferably comprises a pair of jaws of which one is constituted by one end of an elongate support member. The other jaw is preferably part of a movable member disposed generally parallel to the support member and linked to it by a mechanical linkage which constrains the movable member to move laterally without rotation with respect to the support member and the fixed jaw. An actuator, which is preferably a pneumatic cylinder and piston is disposed along the support member so that the stroke of the actuator is along the support. The actuator is coupled, preferably by way of a bell crank, to the linkage in order to operate the jaws.

DESCRIPTION OF THE PREFERRED EMBODIMENT

Figure 1:
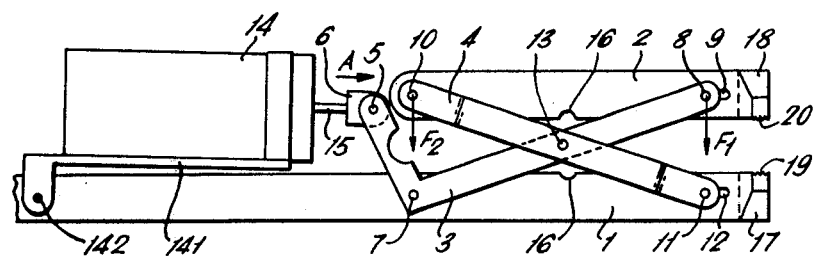
FIG. 1 illustrates an embodiment of a gripper according to one embodiment of the invention.
Figure 2:
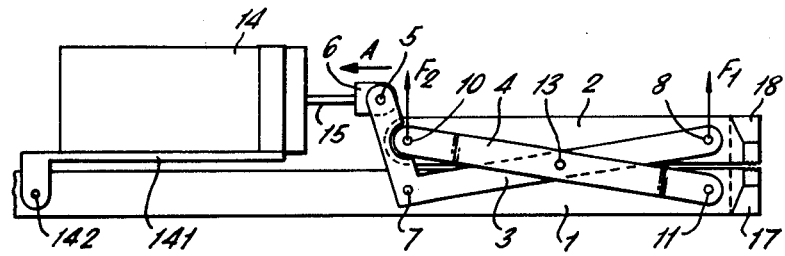
FIG. 2 shows the gripper of FIG. 1 when the jaws are closed together.

The gripper shown in FIGS. 1 and 2 comprises an elongate support member 1 and a movable elongate member 2 disposed side-by-side and parallel to the elongate support member 1. The members constitute jaws, and can be closed together in a manner to be described. The movable member 2 can be translated without rotation directly towards and away from the support member 1, that is to say laterally, and is contrained to move in that manner by a linkage system comprising a bell crank 3 and a lever 4. One arm of the bell crank 3 is pivotally connected at a point 5 to the head 6 of an actuator. The fulcrum of the bell crank is connected by a pivot pin 7 to the member 1 and the other arm of the bell crank is connected to the movable member 2 by a pivot pin 8 which is free to slide along a slot 9 disposed near the right-hand end of the member 2. One end of the lever 4 is pivotally connected at a point 10 near the other end of the movable member 2 whereas the other end of the lever 4 is connected to the support member 1 by a pivot pin 11, which is free to slide along a slot 12 provided near the right-hand end of the member 1. The lever 4 is connected near its middle by a pivot pin 13 to the bell crank 3.

An actuator for the gripper is constituted by a pneumatic cylinder 14 disposed lengthwise along the support 1. The cylinder has a piston rod 15 on which the head 6 is mounted. The cylinder 14 is mounted on a bracket 141 which is pivoted by a pin 142 to the elongate support member 1. The mounting of the cylinder allows it to tilt to accommodate the changing level of the adjacent end of the bell crank 3 as the bell crank rotates.

A hydraulic or other actuator could be used instead of the pneumatic actuator but the use of a pneumatic actuator is convenient because different pressures may be applied to it, by way of a pneumatic line (not shown) so as to provide different strength of grip by means of the jaws.

Operation of the actuator, which could be either manually or automatically controlled, drives the piston and the head 6 in the direction shown by the arrow A in FIG. 1. The motion of the head causes the bell crank 3 to rotate clockwise, as viewed in the drawings, about the fulcrum 7 so that a force $F_1$ shown in FIG. 1 acting to close the gripper is exerted by the pivot pin 8 on the side wall of the slot 9. The linkage causes a corresponding force $F_2$ to act to close the gripper. As the gripper closes, the pivot pins 8 and 11 slide along the respective slots 9 and 12 to accommodate the length of the lever 4 and bell crank 3 as the angle between them decreases.

Opening of the gripper is achieved by a reversal of the closing procedure. A return spring (not shown) could be provided to activate the return of the piston 15 when the pressure in the pneumatic system is released.

The gripper shown in FIGS. 1 and 2 might also be provided with a linkage system identical to the one already shown, on the opposite side of the jaws. If so, the pivot pins may pass through both linkage systems and the jaws.

Recesses 16 are provided to accommodate the pivot pin 13 on closure of the gripper. The lever 4 has a raised central portion in order to bridge the bell crank 3 in the cross-over region.

The jaws, which in the present embodiment are constituted by the right-hand ends of the members 1 and 2 may be further defined by projections 17 and 18 which extend perpendicularly to the members 1 and 2 respectively. These projections have confronting surfaces 19 and 20 between which an object such as a wire can be clamped. The force exerted on the gripped object is determined by the range of movement of the jaw 2 and the profile of the surfaces 18 and 19 determines the nature of the gripping operation. For example, these surfaces may be serrated to facilitate clamping of the object or sharpened to provide a cutting or pinching action.

In normal operation, the jaw provided by member 1 is stationary and so the surface 19 provides a datum against which the object to be clamped or severed is pressed by the second jaw.

The projections 17 and 18 may be removable to allow for the attachment of different tools.

The gripper is intended for use in automatic handling systems, in particular for a process such as the automated production of wiring looms. Several gripper mechanisms could be provided, each mechanism being adapted to perform a specific gripping operation such as holding, severing, crimping or wirestripping.

I claim:

1. A mechanical robot gripper hand comprising:
   (a) an elongate support member defining a first jaw;
   (b) a movable member disposed generally parallel to said support member, said movable member including a second jaw in confronting relationship with said first jaw;
   (c) means including a parallel movement mechanical linkage for constraining said movable member to move laterally without rotation so as to open and close said jaws;

(d) an actuator having a stroke along said support member; and (e) means for mechanically coupling said stroke to said linkage for operating said jaws.

2. A gripper hand as set forth in claim 1 in which said parallel movement linkage includes a bell crank coupled to said actuator.

3. A mechanical gripper comprising:

(a) an elongate support member defining a first jaw;

(b) a movable member disposed generally parallel to said support member, said movable member including a second jaw in parallel confronting relationship with said first jaw;

(c) a parallel movement mechanical linkage for constraining said movable member to move laterally without rotation so as to open and close said jaws, said linkage including a bell crank; and (d) an actuator having a stroke along said support member and comprising a relatively fixed part having a pivotal connection to said support member and a running part coupled to said bell crank, said pivotal connection permitting said relatively fixed part to accommodate rotary movement of said bell crank as the said jaws open and close, and said bell crank constituting means for mechanically coupling the stroke to the linkage for operating said jaws.

4. A gripper as set forth in claim 3 in which said fixed part and said running part comprise a pneumatic cylinder and a piston thereof.

5. A mechanical gripper comprising:

an elongate support member having at one end means defining a first jaw;

a movable member disposed parallel to said support member, said movable member including means defining a second jaw in confronting relationship with said first jaw;

means defining a pair of parallel slots in said support member and movable member respectively;

a mechanical linkage including a first lever member having a pivotal connection at one end of said movable member and a pivotal connection to the slot in said elongate support member, and a bell crank having a pivotal connection to the slot in the movable member, an intermediate pivotal connection to the lever member and a pivotal connection to the elongate support member;

an actuator comprising a fixed part having a pivotal connection to said elongate support member and a running part disposed for movement generally lengthwise of said support, said running part including means connecting said part to said bell crank.

* * * * *